United States Patent
Summer

(10) Patent No.: US 8,125,797 B2
(45) Date of Patent: ***Feb. 28, 2012

(54) RADIATION TOLERANT ELECTRICAL COMPONENT WITH NON-RADIATION HARDENED FET

(75) Inventor: Steven E. Summer, Shirley, NY (US)

(73) Assignee: Modular Devices, Inc., Shirley, NY (US)

( * ) Notice: Subject to any disclaimer, the term of this patent is extended or adjusted under 35 U.S.C. 154(b) by 9 days.

This patent is subject to a terminal disclaimer.

(21) Appl. No.: 11/333,457

(22) Filed: Jan. 17, 2006

(65) Prior Publication Data

US 2006/0181905 A1   Aug. 17, 2006

Related U.S. Application Data

(63) Continuation-in-part of application No. 11/288,653, filed on Nov. 29, 2005, which is a continuation of application No. 10/806,872, filed on Mar. 22, 2004, now Pat. No. 6,982,883.

(51) Int. Cl.
 *H02M 3/335* (2006.01)
 *H02H 7/122* (2006.01)
(52) U.S. Cl. ............... 363/21.01; 363/21.15; 363/56.01
(58) Field of Classification Search ............. 363/21.12, 363/21.15, 21.18, 21.01, 21.13, 21.17, 56, 363/56.01
See application file for complete search history.

(56) References Cited

U.S. PATENT DOCUMENTS

| | | | |
|---|---|---|---|
| 3,836,836 A | 9/1974 | Cowett, Jr. | |
| 4,559,590 A | 12/1985 | Davidson | |
| 4,645,998 A | 2/1987 | Shinohara et al. | |
| 4,928,220 A | 5/1990 | White | |
| 5,325,230 A | 6/1994 | Yamagata et al. | |
| 5,499,183 A | 3/1996 | Kobatake | |
| 5,870,296 A | 2/1999 | Schaffer | |
| 5,949,226 A * | 9/1999 | Tanaka et al. | 323/285 |
| 6,025,705 A | 2/2000 | Nguyen et al. | |
| 6,108,219 A * | 8/2000 | French | 363/23 |
| 6,157,182 A * | 12/2000 | Tanaka et al. | 323/284 |
| 6,452,818 B1 | 9/2002 | Simopoulos | |
| 6,473,317 B1 | 10/2002 | Simopoulos | |
| 6,519,165 B2 | 2/2003 | Koike | |
| 6,917,533 B2 * | 7/2005 | Gardner et al. | 365/94 |
| 6,982,883 B2 * | 1/2006 | Summer | 363/21.12 |
| 2001/0030879 A1 | 10/2001 | Greenfeld et al. | |

* cited by examiner

*Primary Examiner* — Adolf Berhane

(74) *Attorney, Agent, or Firm* — Feldman Law Group, P.C.; Stephen E. Feldman

(57) ABSTRACT

A radiation tolerant electrical component is provided without a radiation hardened material FET. A p-channel MOSFET provides switching capabilities in radiated environments because its gate voltage starts at a negative value and becomes more negative with exposure to radiation. Therefore, the gate is still controllable when exposed to radiation.

5 Claims, 3 Drawing Sheets

RADIATION TOLERANT ELECTRICAL COMPONENT WITH NON-RADIATION HARDENED FET

CROSS-REFERENCE TO RELATED APPLICATION

This application is a continuation-in-part of co-pending application Ser. No. 11/288,653 filed Nov. 29, 2005, which, in turn, is a continuation of application Ser. No. 10/806,872 filed Mar. 22, 2004, now U.S. Pat. No. 6,982,883.

FIELD THE INVENTION

The object of this invention is a method of producing an economical DC/DC converter or switching regulator that can operate in a high ionizing radiation dose and high energy particle environments, such as found in space and particle accelerator applications.

BACKGROUND OF THE INVENTION

DC/DC converters are electronic devices that use switching components, such as field effect transistors (FETs) to transform voltage from one level to another. Typically, the output voltage is regulated and protected against short circuits. In many cases, the input and output potentials are galvanically isolated from each other.

A preferred semiconductor device for power switching in a DC/DC converter is the insulated gate FET (Field Effect Transistor) because of its high power gain. FETs used for power switching use are usually enhancement mode types. This means that they are normally non-conducting. When a gate voltage above a threshold is applied, the FET becomes conducting. FETs are available in two gate polarities; N channel and P channel.

In an FET, current flows along a semiconductor path called the channel. At one end of the channel, there is a source electrode, and at the other end, a drain electrode. The physical diameter of the channel is fixed, but its effective electrical diameter is changed by applying voltage to a gate electrode. The conductivity of the FET depends, at any given time, on the electrical diameter of the channel. A small change in gate voltage can cause a large variation in current from the source to the drain. In this way, the FET switches current on or off.

Typically, FETs used for power switching are enhancement mode types, that is, they are normally non-conducting. When a gate voltage above a certain threshold is applied, the FET becomes conducting. Such FETs are used to control current flow and are available in two gate polarities; N channel and P channel.

Among many applications, DC/DC converters are used in spacecraft, satellites and in high energy physics instrumentation where they are subjected to many forms of radiation damage. When electrical components are exposed to radiation, they behave differently. For example, when an N channel FET is exposed to relatively low radiation levels, the gate threshold voltage ultimately falls close to zero. In this condition, the FET conducts current with little or no applied gate voltage. In other words, the FET is uncontrollable because the current running through the channel cannot be easily shut off.

DC/DC converters and power switching circuits designed for general purpose use are typically constructed with N channel FETs because, for any given die size transistor, the N channel FET has a lower on resistance than a correspondingly sized P channel FET.

In general, a DC/DC converter or switching regulator includes a power chopping stage which converts the DC input power to a periodically pulsating DC waveform. This stage is followed by a filtering stage where the periodically pulsating DC waveform is converted back to a DC level. A transformer may be interposed between the power chopping stage and the filtering stage to provide input to output isolation.

The DC/DC converter or switching regulator also includes repetitive pulse drive circuitry which controls the operation of the power chopping stage so as to achieve the desired power output.

To use electrical components in high radiation environments, they are often designed to withstand the damage caused by radiation. Present art for radiation hardened DC/DC converters use specially designed radiation hardened N channel FETs for the power chopping stage. The radiation hardening process usually involves removing or adding some specific element or ions to the materials used for making the components. Being radiation hardened the gate threshold voltage experiences minimal change after exposure to radiation. One method for chemically radiation hardening DC/DC converters is disclosed in U.S. Pat. No. 3,836,836 to Cowett, Jr. (Cowett).

The principal benefit of radiation hardened N channel FETs is that the gate threshold voltage doesn't change significantly with radiation exposure. The DC/DC converter therefore functions despite the accumulated radiation dose. Additionally, the downside of these specially designed radiation hardened N channel FETs is that they (1) have a sole source of supply, (2) are expensive, (3) have long lead times and (4) have limited availability. In turn, this affects the market for radiation tolerant DC/DC converter circuits incorporating this type of FET with higher prices, longer delivery times and limited availability.

SUMMARY OF THE INVENTION

The gate threshold voltage of a conventional, non-radiation hardened P channel FET shifts more negatively as it is exposed to accumulated radiation dose. However, the initial gate threshold voltage is negative with respect to the source. Therefore, the gate threshold voltage never goes through a region where the FET is uncontrollable, it only goes from a negative value to a more negative value. Therefore, DC/DC converters made with conventional P channel FETs can be more immune to total dose effects than those made using conventional N channel FETs if the proper gate drive signal is provided.

Therefore, in the present invention, a radiation tolerant high-power DC/DC converter is disclosed. The converter does not incorporate radiation-hardened parts, but instead uses p-channel FET switches that have a negative gate threshold voltage. With exposure to radiation, the gate threshold voltage decreases, becoming more negative. Thus, the gate is still controllable.

The radiation tolerant electrical component for providing controlled electrical response in radiation-intensive applications comprises a non-hardened p-channel FET supplying input voltage to a non-hardened n-channel FET with a negative bias to provide a controlled electrical output from the n-channel FET.

Accordingly, in the on state for the P-channel FET, a negative gate to source drive waveform, sufficiently high in magnitude, saturates the drain to source channel. It must not be so high however, that the gate to source breakdown voltage rating of the FET is exceeded. It is important to maximize the magnitude of the gate voltage signal, because the higher the signal magnitude is, the higher radiation dose the FET will tolerate and still work acceptably in the DC/DC converter circuit.

In the off state of the FET, a gate to source drive signal, sufficiently low to reduce current flow, is applied through the drain to source channel. It must, however, not be so high in positive magnitude that that the gate can rupture due to passage of high energy particles normally encountered in radiation environments, increasing Single Event Upset resistance.

DETAILED DESCRIPTION

Figure 1:
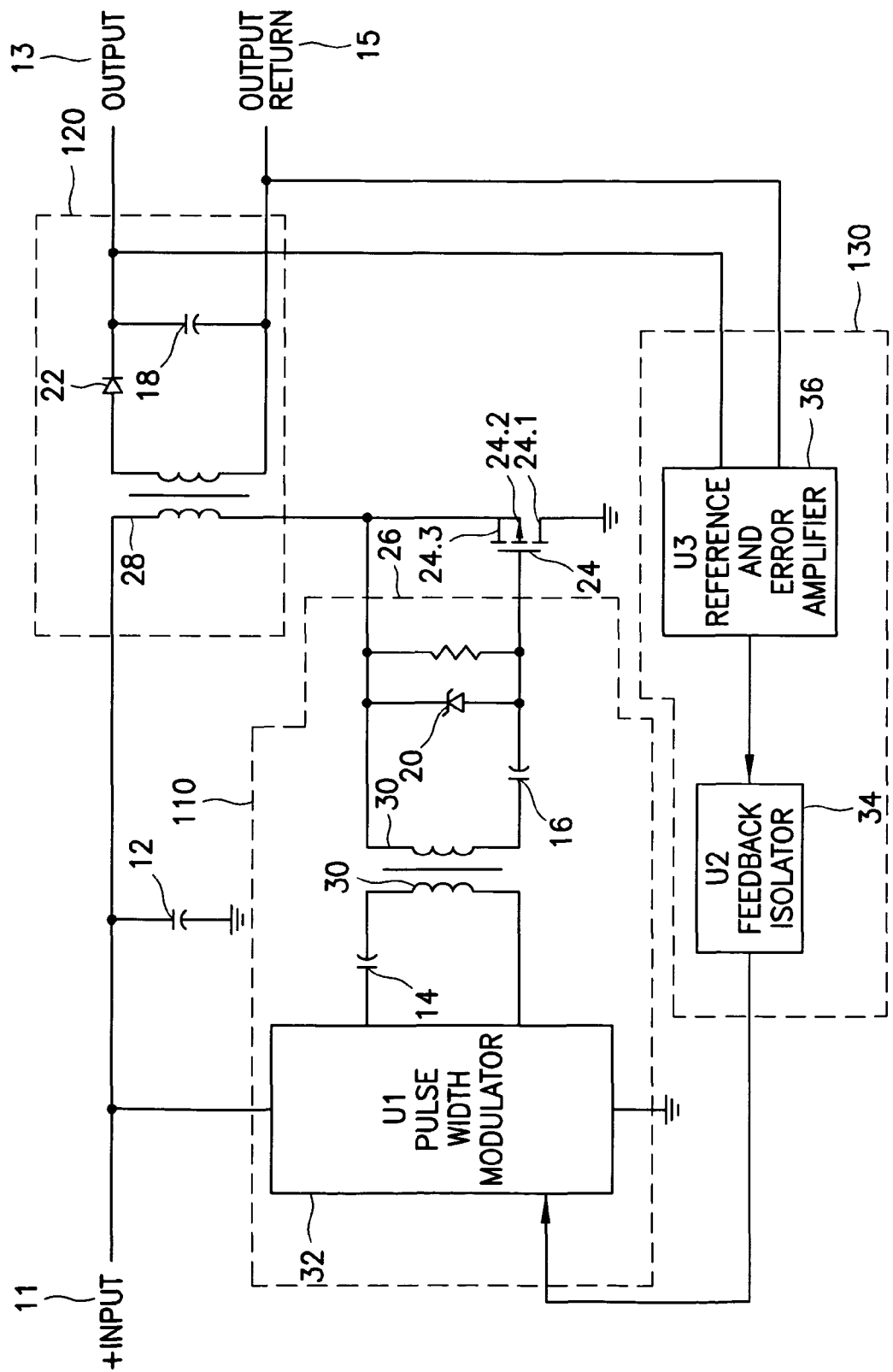
FIG. 1 is a circuit diagram for an exemplary radiation tolerant DC/DC converter according to an embodiment of the present invention.

Field-effect transistors exist in two major classifications, the junction FET (JFET) and the metal-oxide-semiconductor FET (MOSFET). A MOSFET is a special type of FET that works by electronically varying the width of a channel along which charge carriers (electrons or holes) flow. Wider channels provide better conductivity. The charge carriers enter the channel at the source, and exit via the drain. The width of the channel is controlled by the voltage on an electrode called the gate, which is located physically between the source and the drain and is insulated from the channel by an extremely thin layer of metal oxide.

There are two ways in which a MOSFET can function. The first is known as depletion mode. When there is no voltage on the gate, the channel exhibits its maximum conductance. As the voltage on the gate increases (either positively or negatively, depending on whether the channel is made of P-type or N-type semiconductor material), the channel conductivity decreases. The second mode of MOSFET operation is called enhancement mode. When there is no voltage on the gate, there is in effect no channel, and the device does not conduct. A channel is produced by the application of a voltage to the gate. Increasing gate voltage increases conductivity and thus, current flow.

The MOSFET has certain advantages over the conventional junction FET, or JFET because the gate is insulated electrically from the channel. No current flows between the gate and the channel, regardless of the gate voltage (as long as it does not become so great that it causes physical breakdown of the metallic oxide layer). Thus, the MOSFET has practically infinite impedance.

In this type of application, namely a DC/DC power converter, the salient characteristics of the semiconductor switch are its off voltage withstanding capability (the drain to source voltage) and its on resistance (which should be as low as possible). MOSFETS are used over JFETS because MOSFETS have much better drain to source voltage and on resistance characteristics.

When conventional non-radiation hardened N Channels FETs are used in applications where radiation is present, the FETs become uncontrollable at relatively low radiation levels because the gate threshold voltage of the N channel FET experiences a negative shift, and ultimately falls close to zero. At that point, the N channel FET conducts current with little or no gate voltage applied making it uncontrollable, like a flood gate that cannot be closed.

The gate threshold voltage of a conventional, non-radiation hardened P channel FET also shifts negatively with radiation exposure. However, the initial threshold voltage of an ordinary P channel FET is negative to begin with. In the presence of radiation, therefore, the gate threshold voltage does not approach zero and therefore will not become uncontrollable. The gate threshold voltage does change, but from a negative value to a more negative value. Conventional P channel FETs, therefore, are more robust to total radiation dose effects as compared to conventional N channel FETs when the proper gate drive signal is provided.

In accordance with an embodiment of the present invention, the gate drive signal should be high enough to saturate the drain to source channel. It should not, however, be so high that the gate to source breakdown voltage rating of the FET is exceeded. Preferably, the FET operates close to its maximum gate voltage signal because higher signals can handle higher radiation levels, and therefore, the FET functions across a larger range of radiation exposure.

FIG. 1 shows a circuit diagram for a DC/DC converter in accordance with a preferred embodiment of the present invention. An input line 11 provides an input signal to a drive circuit 110 that drives an FET 24 to produce an output. The FET output is run through a rectification circuit 120 before being supplied on an output line 13 and output return 15. An isolation circuit 130 isolates the input 11 from the output 13 and 15.

The FET 24, preferably a p-channel MOSFET, has its drain terminal 24.1 connected at or near the ground potential. The gate 24.2 and source 24.3 terminals are switched so that the drain 24.1 acts as an electrostatic shield, reducing current flow into the metal case that houses the converter, thereby minimizing unwanted electromagnetic emissions from the DC/DC converter.

In the drive circuit 110, a drive pulse transformer 30 inverts the polarity of the drive signal and transmits a negative gate drive signal to the MOSFET 24. The transformer also provides electrical isolation, allowing use of a standard integrated circuit (IC) 34 to provide the drive signal.

The transformer 30 primary winding is connected to the drive circuit 32, a standard pulse width modulator IC in this case. A primary blocking capacitor 14 connected between the modulator 32 and the transformer 30 on the primary winding prevents DC current from flowing into the primary winding of the transformer 30. A secondary blocking capacitor 16 blocks the DC voltage component from appearing across the secondary winding of the transformer 30. The pulse width modulator IC 32 generates the drive pulses that drive a switching duty cycle in the MOSFET 24 to produce the desired overall output voltage from the flyback circuit.

On the secondary side of the transformer 30, the secondary blocking capacitor 16 and a shunt diode 20 restore the DC component of the drive pulse. The shunt diode 20 may be a zener diode. Use of a zener diode permits transient voltages from appearing on the FET gate 24.2. The zener diode 20 combines the functions of a DC restorer and prevents the voltage on the gate of the FET 24 from exceeding a safe magnitude. A bleeder resistor 26 may be placed across the shunt diode 20 to provide a discharge path for the secondary blocking capacitor 16 so that the MOSFET 24 is in the off state at initial power application.

The output of the drive circuit 110 consisting of the pulse width modulator 32, primary blocking capacitor 14, transformer 30, secondary blocking capacitor 16, shunt diode 20, and bleeder resistor 26 is connected between the gate 24.2 and source terminals 24.3 of the P-channel MOSFET 24. The phasing of the transformer 30 is such that a positive going input signal from the modulator IC 32 results in a negative going drive signal to the MOSFET 24.

A power supply decoupling capacitor 12 provides a local low impedance path for current pulsations drawn by the power circuit. An output peak filter capacitor 18 holds the peak DC voltage produced by the flyback power circuit. An output rectifier diode 22 is the output rectifier for the flyback power stage.

Within the isolation circuit 130, a feedback isolator 34 transfers the feedback error signal across the galvanic barrier from the input side 11 to the isolated output side 13 and 15. The reference and error amplifier 36 compares the output signal to a reference voltage and creates an amplified error voltage that will be ultimately transmitted to the pulse width modulator IC 32.

It should be noted that instead of using the drive pulse transformer 30 for polarity inversion and voltage level shifting, a direct coupled transistor inverter circuit can be used to shift levels and invert the FET drive waveform.

Figure 2:
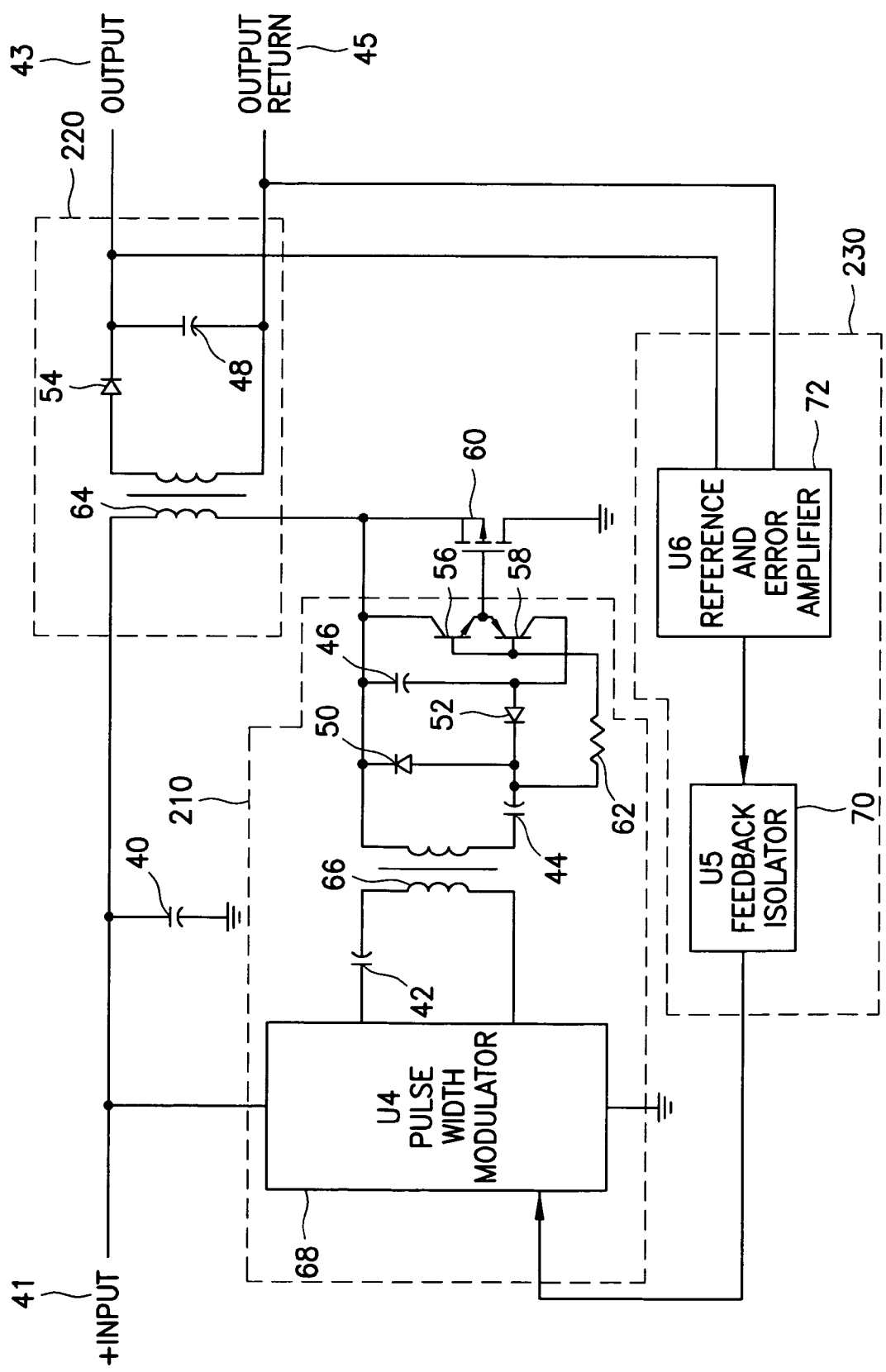
FIG. 2 is a circuit diagram for an exemplary radiation tolerant DC/DC converter according to an alternative embodiment of the present invention.

In an alternative embodiment of the drive circuit, shown in FIG. 2, an input line 41 provides an input signal to a drive circuit 210 that drives an FET 60 to produce an output. The FET output is run through a rectification circuit 220 before being supplied on an output line 43 and output return 45. An isolation circuit 230 isolates the input 41 from the output 43 and 45.

In the drive circuit 210, a secondary blocking capacitor 44, shunt diode 50, series diode 52 and shunt capacitor 46 are driven by a drive pulse transformer 66 secondary forming a standard half wave voltage double circuit. The drive pulse transformer 66 transmits the gate drive signal to the transistors 56 and 58. An NPN 56-PNP 58 buffer is connected to the junction of the blocking capacitor 44 and two diodes 50, 52 through a resistor 62. The resulting drive waveform connected to the gate and source terminals of the P channel FET 60 is essentially devoid of unwanted voltage transients and has a low output impedance which is well suited to drive the capacitance of the gate terminal of the FET 60. An NPN bipolar transistor 56 buffers the gate drive signal for the P-channel enhancement MOSFET 60 and a PNP bipolar transistor 58 buffers the drive gate drive signal. The P channel enhancement MOSFET 60 switches the transistor 64 for the flyback converter. An isolation resistor 62 minimizes the possibility that the transistors 56 and 58 can saturate, which would cause them to switch more slowly.

A power supply decoupling capacitor 40 provides a local low impedance path for current pulsations drawn by the power circuit. A primary blocking capacitor 42 blocks the DC voltage component from appearing across the primary winding of the drive pulse transformer 66. A secondary blocking capacitor 44 blocks the DC voltage from the secondary winding of the drive pulse transformer 66. A DC restorer diode 50 is connected across the drive pulse transformer 66 primary winding. A prevention diode 52 prevents the discharge of the peak filter capacitor 46 when the voltage of the cathode 52 becomes positive with respect to the anode.

A gate output peak filter capacitor 46 holds the peak DC voltage produced by the gate drive signal. A flyback output peak filter capacitor 48 holds the peak DC voltage produced by the flyback power circuit. The main flyback transformer 64 regulates the output line 43 and output return 45. An output rectifier 54 for the flyback power stage is connected to the main flyback transformer 64.

A pulse width modulator IC 68 generates the drive pulses to attain a switching duty cycle in the P-channel MOSFET 60 that produces the desired overall output voltage from the flyback circuit. A feedback isolator 70 transfers the feedback error signal across the galvanic barrier from the input side 41 to the isolated output side 43 and 45. A reference and error amplifier 72 compares the output signal to a reference voltage and creates an amplified error voltage that will be ultimately transmitted to the pulse width modulator IC 68.

This design circuit technique can be extended to employ two or more secondary windings on the drive transformer, each secondary driving a suitable rectification and DC restoration circuit. The output of each drive rectification and DC restoration circuit will be connected between the gate and source of a P channel FET.

In such a configuration, the two or more transformer secondary windings may be used to drive the FETs in an in phase or out of phase arrangement, depending on the desired configuration for the switching FETs.

Figure 3:
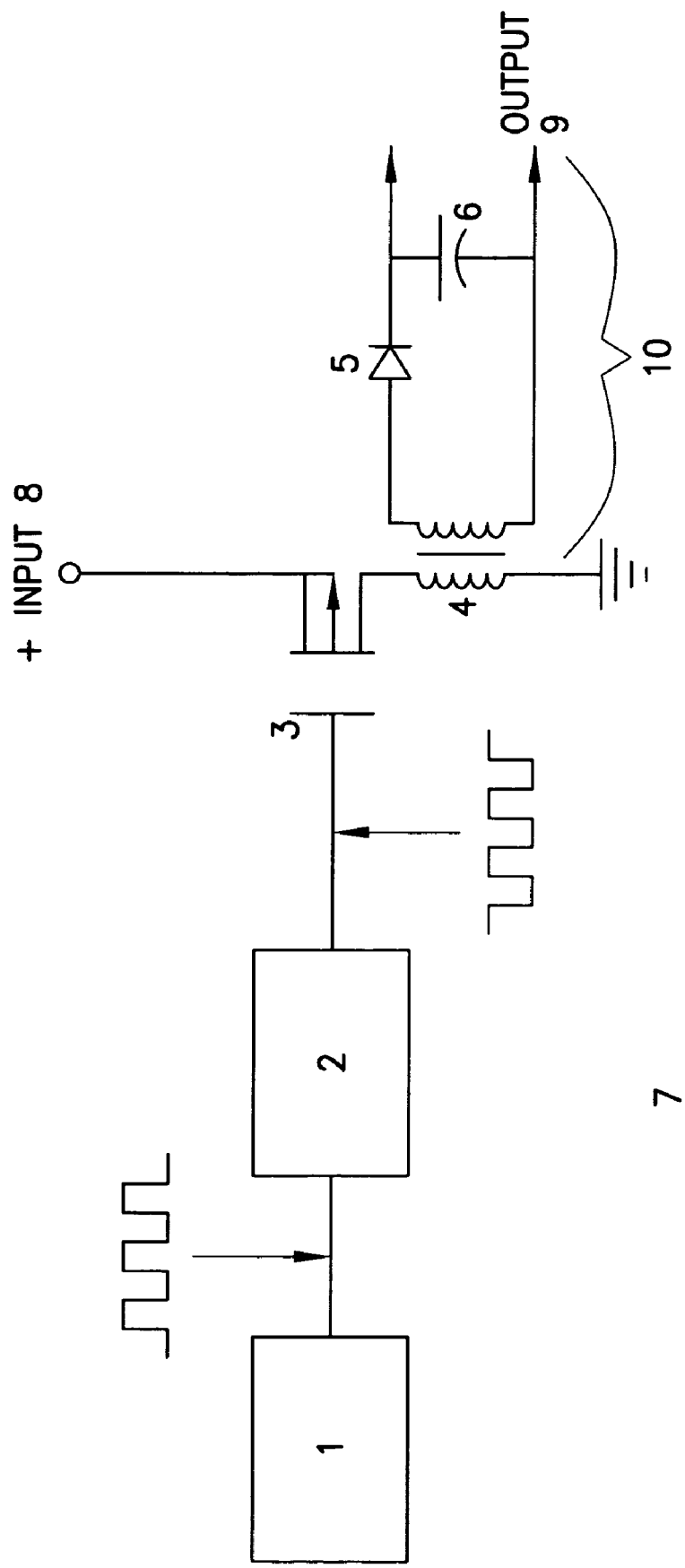
FIG. 3 is a block diagram of a circuit according to a third embodiment of the present invention.

FIG. 3 shows a third embodiment of the present invention. This embodiment shows a standard type of integrated circuit 7. The circuit includes a drive signal connected in series to an inverter 2 which is connected to a gate of a P-channel FET 3.

The circuit also includes a power circuit 10 that is connected to the drain of the P-Channel FET 3. The power circuit 10 being a transformer 4 connected in series with a diode 5 and in parallel with capacitor 6.

During operation an input 8 is received via the source of the P-Channel FET 3 and the output 9 is a voltage shown across capacitor 6. Drive signal 1 is provided via either (1) a periodic pulse source or (2) through the use of pulse width modulation drive circuitry. This drive signal 1 is inverted by inverter 2 thereby providing a negative going drive signal that operates the P-channel FET gate terminal. The inverter 2 may be any device, such as a transformer or transistor inverter circuit that is used to invert the polarity of a drive signal. An additional feature of the inverter means 2 is to provide electrical isolation for the circuit 7.

To operate the circuit 7 certain design constraints must be put on the drive signal to optimize its operation despite the accumulation of ionizing radiation is as follows. Therefore, to turn on the FET 3, a negative gate to source drive voltage is maximized within limits safe for device ratings thereby allowing the circuit to operate despite parametric shifts due to accumulated ionizing radiation dose. To turn off the FET 3, a gate to source drive voltage as close to zero as possible is provided so as to prevent single event damage from high energy particles.

Please note, the invention requires the use of one or more non radiation hardened P-channel MOSFET switching transistors 3. These FETs are the sole principal power switching device or devices for the circuit. The present invention excludes DC/DC converters or switching regulators that use one or more non radiation hardened N channel FETs in conjunction with one or more non radiation hardened P-channel FETs in the power chopping stage, since the resultant DC/DC converter or switching regulator would fail after extensive radiation exposure due to the failure of the non radiation hardened N channel FET.

It also excludes any applications where specifically radiation hardened N or P channel FETs are used in a power chopping stage, since then there is no economic benefit.

In the preceding specification, the invention has been described with reference to specific exemplary embodiments thereof. It will however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A radiation tolerant component for providing controlled electrical response in radiation-intensive applications comprising: At least one non-radiation hardened P-channel FET switching transistor, the transistor having a gate, a drain, and a source; a voltage source, said stored voltage source, having a positive terminal and negative terminal; and an inverter, said inverter having a positive and negative terminal, said voltage source, and said inverter being in series with the gate of the transistor, whereby the transistor is the sole principle power switching device of a radiation tolerant high-power DC/DC converter, the FET operating close to the maximum gate voltage signal so that higher signals handle higher radiation levels and the FET functions across a large range of radiation exposure handling high radiation levels, whereby said radiation tolerant component produces a gate drive signal in a range that is high enough to saturate a drain to source channel of the FET but not so high as to exceed a gate-to-source breakdown voltage rating of the FET.

2. The radiation tolerant electrical component as claimed in claim 1, wherein the voltage source is a pulse width modulation drive circuit.

3. The radiation tolerant electrical component as claimed in claim 1, wherein the transistor retains power control over the switching circuit, despite parametric shifts accumulated in the high-ionizing, radiation-doses environment.

4. The radiation tolerant electrical component as claimed in claim 1, wherein when the transistor is in an on-state, a maximized drive waveform is applied to the gate to source channel of the transistor, thereby allowing the transistor to tolerate and function in the high-ionizing radiation dose environment.

5. The radiation tolerant electrical component as claimed in claim 1, whereby, when the transistor is in an off-state, a sufficiently low drive waveform is applied to tolerate and function in the high-ionizing, radiation-dose environment.

* * * * *